United States Patent
Wolf

(10) Patent No.: US 11,478,968 B2
(45) Date of Patent: Oct. 25, 2022

(54) METHOD FOR PRODUCING A TUBE AND INJECTION-MOLDING DEVICE

(71) Applicant: KAUTEX TEXTRON GMBH & CO. KG, Bonn (DE)

(72) Inventor: Hartmut Wolf, Koenigswinter (DE)

(73) Assignee: KAUTEX TEXTRON GMBH & CO. KG, Bonn (DE)

( * ) Notice: Subject to any disclaimer, the term of this patent is extended or adjusted under 35 U.S.C. 154(b) by 943 days.

(21) Appl. No.: 16/062,938

(22) PCT Filed: Dec. 15, 2016

(86) PCT No.: PCT/EP2016/081264
§ 371 (c)(1),
(2) Date: Jun. 15, 2018

(87) PCT Pub. No.: WO2017/102987
PCT Pub. Date: Jun. 22, 2017

(65) Prior Publication Data
US 2020/0290250 A1   Sep. 17, 2020

(30) Foreign Application Priority Data

Dec. 18, 2015   (DE) ...................... 10 2015 225 938.2

(51) Int. Cl.
*B29C 45/17* (2006.01)
*B29C 45/00* (2006.01)

(52) U.S. Cl.
CPC ...... *B29C 45/1704* (2013.01); *B29C 45/1711* (2013.01); *B29C 2045/0087* (2013.01);
(Continued)

(58) Field of Classification Search
CPC ............. B29C 45/1704; B29C 45/1711; B29C 2045/0087; B29C 2045/1719;
(Continued)

(56) References Cited

U.S. PATENT DOCUMENTS 5,484,561 A * 1/1996 Weber ............... B60R 21/21656
264/46.4
5,948,343 A * 9/1999 Hiroki ................. B29C 33/0033
264/319
(Continued)

FOREIGN PATENT DOCUMENTS

DE       69615114       6/2002
DE      102014112262    3/2016
(Continued)

OTHER PUBLICATIONS

English translation of International Search Report dated Mar. 15, 2017, received in corresponding PCT Application No. PCT/EP2016/081264.
(Continued)

*Primary Examiner* — Jacob T Minskey
*Assistant Examiner* — Caroline Beha
(74) *Attorney, Agent, or Firm* — Grossman, Tucker, Perreault & Pfleger, PLLC

(57) ABSTRACT

The invention relates to a method for producing a tube by injection molding a thermoplastic molding compound by using an injection-molding device with an article cavity, which defines the outer contour of the tube, and with an injection device, which is designed to drive a profile through the article cavity filled with the thermoplastic molding compound and thereby displace a liquid core of the molding compound, wherein the method envisages closing an opening of the article cavity with a mould core, which with the article cavity forms a hollow mould space and which has a secondary cavity that can be filled with the molding compound. After the filling of the article cavity and the hollow mould space with the thermoplastic molding compound, a projectile is driven through the article cavity, wherein the projectile displaces the molding compound into the secondary cavity. Subsequently, the mould core with the filled (Continued)

secondary cavity is pulled, wherein the displaced molding compound is separated from the molding compound forming the tube. The invention also relates to an injection-molding device for carrying out the method.

15 Claims, 2 Drawing Sheets

(52) U.S. Cl.
CPC .................. *B29C 2045/1707* (2013.01); *B29C 2045/1719* (2013.01); *B29C 2045/1726* (2013.01)

(58) Field of Classification Search
CPC ............ B29C 2045/1726; B29C 45/00; B29C 33/0033; B29C 33/76; B29C 45/7613; B29C 45/2669
See application file for complete search history.

(56) References Cited

U.S. PATENT DOCUMENTS 8,827,690 B2 * 9/2014 Sakamoto ........... B29C 45/0055
425/577

| | | | | |
|---|---|---|---|---|
| 2006/0125149 | A1 * | 6/2006 | Takada ............. | F02M 35/10321 264/328.2 |
| 2012/0068388 | A1 | 3/2012 | Sakamoto et al. | |
| 2013/0236591 | A1 | 9/2013 | Sakamoto et al. | |

FOREIGN PATENT DOCUMENTS

| | | | | |
|---|---|---|---|---|
| DE | 102014112262 A1 | * | 3/2016 | ......... B29C 45/1705 |
| EP | 2511065 | | 10/2012 | |
| JP | 10180812 A | * | 7/1998 | ............ B29C 45/00 |
| JP | H10180812 | | 7/1998 | |
| JP | 10296800 A | * | 11/1998 | ......... B29C 45/1704 |
| JP | 2011-518698 | | 6/2011 | |
| JP | 2012-131136 | | 7/2012 | |
| JP | 2012-213919 | | 11/2012 | |
| JP | 2012-224083 | | 11/2012 | |
| JP | 2012213919 A | * | 11/2012 | ......... B29C 45/1704 |
| WO | 2014/013304 | | 1/2014 | |

OTHER PUBLICATIONS

English translation of International Preliminary Report on Patentability dated Jun. 21, 2018, received in corresponding PCT Application No. PCT/EP2016/081264.

* cited by examiner

METHOD FOR PRODUCING A TUBE AND INJECTION-MOLDING DEVICE

FIELD

The invention relates to a method for producing a tube by injection molding a thermoplastic molding compound while using an injection molding device having an article cavity which defines the external contour of the tube, having an injection device which is configured for driving a projectile through the article cavity that is filled with the thermoplastic molding compound while displacing a liquid core of the molding compound.

The invention furthermore relates to an injection molding device for producing tubes, having a tool that forms an article cavity, having means for filling the article cavity with a thermoplastic molding compound, having an injection device for injecting a fluid toward a projectile that is to be driven from a first opening of the article cavity through the article cavity in the direction toward a second opening of the article cavity, and having a secondary cavity for receiving the molding compound that is displaced by the projectile.

The invention relates in particular to a method for producing a tube, for example a filling tube for a fuel container or a secondary liquids container of a motor vehicle, said container having a geometry integrally molded thereto for receiving connector components such as, for example, pipe connectors, latching connectors, or the like.

BACKGROUND

Various methods for producing tubes from thermoplastic plastics material are known in the prior art. Such tubes can be produced, for example, by extrusion blow-molding, in particular by suction blow-molding, or by injection molding. Tubes which are curved in various spatial axes, so-called 3D tubes are often produced by suction blow-molding. A tubular preform is extruded herein and pulled into a corresponding blow-molding tool. Extrusion methods in which tubular preforms are placed into an opened tool are also known, wherein the final molding of the preforms within the tool is performed by applying a pressure differential and wherein the tool molds the external contour of the tube.

It is moreover known for tubes to be fabricated by injection molding by means of so-called projectile injection technology. In this method, a projectile that is placed onto an injector is driven through the article cavity of the filled tool, wherein the molten core of the thermoplastic plastics material is displaced into a secondary cavity which after the preliminary filling with polymer is released by way of hydraulically activatable slides. Such tubes have a defined internal diameter and having such a defined, constant internal diameter can be produced in a comparatively reproducible manner.

For example, a respective method for producing a tube by injection molding a thermoplastic molding compound while using an injection device is known from JP 2012 213919 A.

In particular, the production of tubes to be installed as ventilation pipes for air-conditioning systems or as filler pipes for fuel containers, wiper water containers, or urea containers in motor vehicles, or tubes as parts of the supply of combustion air in the case of internal combustion engines for motor vehicles are produced by the methods described above. Such tubes are to be provided with widened connector sleeves, threaded connectors, and branching points which, on account of the production methods mentioned above, are comparatively difficult to mold thereon. For example, injection-molded tubes which are produced with the water injection technology or the projectile injection technology at the ends of said tube do not have any defined connection geometry. On account of the split tool it is also comparatively difficult for respective sealing geometries to be provided at the connector ends of the tubes.

It is therefore known in the prior art for the tubes overall to be configured in multiple parts, for example for connection geometries for latching connectors to be welded to the end sides.

Mechanical post-processing of the ends of the tubes in order for a defined connection geometry to be established is also known.

SUMMARY

The invention is based on the object of providing a method for producing a tube by injection molding a thermoplastic molding compound, by way of which a defined connection geometry at one end of the tube can be produced in a comparatively simple manner in one operating step.

A defined connection geometry in the context of the present invention is to be understood as a reproducible, dimensionally accurate production of a connection geometry, for example in the sense of a sleeve or the like, into which a connector component can be introduced in a sealing manner with an exact fit.

The object is furthermore achieved by an injection molding device for producing tubes, which is provided in particular for carrying out the method according to the invention.

According to one aspect of the invention, a method for producing a tube by injection molding a thermoplastic molding compound is provided, while using an injection molding device having an article cavity which defines the external contour of the tube, having an injection device which is configured for driving a projectile through the article cavity that is filled with the thermoplastic molding compound while displacing a liquid core of the molding compound, wherein the method comprises the following method steps:

A) introducing a projectile into a first opening of the article cavity;
B) closing a second opening of the article cavity, disposed so as to be remote from the first opening, by way of a mold core which together with the article cavity forms a molding cavity and which has a secondary cavity that is capable of being filled with the molding compound;
C) at least partially filling the article cavity and the molding cavity with the thermoplastic molding compound;
D) driving the projectile from the first opening through the article cavity to the second opening while partially displacing the molding compound into the secondary cavity, wherein the projectile is driven toward or into the mold core; and
E) pulling the mold core together with the filled secondary cavity, wherein the displaced molding compound is separated from the molding compound that forms the tube, and wherein a thin place or a predetermined breaking line is generated between the molding compound that forms the tube and the molding compound that is displaced into the secondary cavity.

Any arbitrary thermoplastic polymer can be used as the thermoplastic molding compound in the context of the invention. For example, a thermoplastic plastics material which is selected from the group comprising high-density polyethylene, polyamide, polyamide 6, polyamide 12, polyurethane, polycarbonate, acrylonitrile-butadiene-styrene-copolymer, polyketone, polystyrene, olefin-based thermoplastic elastomers, olefin-based cross-linked thermoplastic elastomers, urethane-based thermoplastic elastomers, thermoplastic polyester elastomers, and thermoplastic copolymers can be provided as the thermoplastic molding compound.

The projectile used for the purposes of the method can be configured as a plastics material projectile that is known per se.

The injection molding device according to the invention expediently comprises a tool having one or a plurality of parts, for example mold halves, that form the article cavity, and means for filling the article cavity.

The method preferably relates to the production of a tube from thermoplastic plastics material as a filler pipe of a fluid container for a motor vehicle, said fluid container preferably having at least one end portion that is widened in the manner of a sleeve.

The filling of the article cavity can be performed partially or completely by way of a usual extrusion installation provided therefor, for example by way of a conveyor screw extruder.

The projectile used in the method can be driven, for example by way of an injection device for injecting water, through the completely or partially filled article cavity. To this end, the injection device can have a projectile carrier which can be penetrated by one or a plurality of fluid ducts and at that end of the former that is configured for receiving the projectile configures an injection nozzle. The projectile, on account of an impingement of the injection nozzle by way of a pressurized fluid, for example by way of water, can be driven through the article cavity by means of the fluid. The molten core of the thermoplastic molding compound that is received by the article cavity is herein displaced into the secondary cavity by the projectile.

It is provided according to the invention for a mold core which seals the article cavity at the end side and which together with the article cavity forms a molding cavity that is capable of being filled with the thermoplastic molding compound, for example in order for a sleeve end of the tube to be configured, to be provided at an end-side opening of the article cavity.

The mold core configures a calibrated internal wall of the tube in the article cavity, wherein it is furthermore provided according to the invention for the molding compound to be displaced to the secondary cavity of the mold core and upon molding the tube for the molding compound that has been displaced by the projectile to be separated from the molding compound that forms the tube by pulling the mold core. A separate sprue duct into the secondary cavity is in particular avoided in this manner.

The method steps A) to E) are preferably carried out in the order of the enumeration thereof.

According to the invention it is provided that a thin place or a predetermined breaking line is generated between the molding compound that forms the tube and the molding compound that is displaced into the secondary cavity even prior to the mold core being pulled.

It can be provided according to the invention that the secondary cavity of the mold core is kept closed, for example by means of one or a plurality of slides, during the filling of the article cavity.

The secondary cavity can be opened immediately prior to the projectile being driven through the article cavity.

As has already been mentioned, this can be performed by means of one or a plurality of hydraulically activatable slides; alternatively, the secondary cavity can be opened with the aid of the melt pressure that is generated by the displaced molding compound.

In the case of the method according to the invention it is provided to first completely or partially fill the article cavity and the molding cavity that is formed by the mold core with the molding compound, to thereafter release the secondary cavity, and to subsequently drive the projectile through the article cavity, wherein the projectile displaces the molten core of the molding compound into the secondary cavity.

The projectile has a diameter that is smaller than the external diameter of the article cavity such that a more or less defined tubular wall remains behind.

A closure member of the mold core expediently first keeps closed an opening of the secondary cavity. The secondary cavity can be configured, for example, as a tubular appendage of the article cavity. Keeping the secondary cavity closed can be kept closed, for example, by way of a spring-loaded or hydraulically activated closure member which is driven back under the melt pressure of the displaced molding compound. As has been mentioned above, this can also be established mechanically by means of a respective controller.

In the case of one expedient variant of the method it is provided that the mold core has a movable closure member which keeps closed the secondary cavity and which immediately prior to the article cavity be filled, or while the article cavity is being filled, is moved into an opened position that releases the secondary cavity.

In the case of one expedient design embodiment of the method of the invention it is provided that the projectile is driven completely into the secondary cavity and in the terminal position closes the secondary cavity.

Alternatively, it can be provided that the projectile is driven only partially into the secondary cavity, wherein a shell area of the textile is brought to bear against an encircling pinch edge of the mold core, the projectile in this terminal position closing the secondary cavity. The projectile when impacting the pinch edge of the mold core herein generates a predetermined breaking line which serves to separate the molding compound that forms the tube from the molding compound that is displaced the secondary cavity of the mold core when the mold core is pulled.

It can be likewise be provided that the projectile is driven partially into the secondary cavity, wherein an encircling shoulder of the projectile is brought to bear against an end side of the mold core, wherein the projectile in this terminal position likewise closes the secondary cavity.

To this end, the projectile can have a perforated shell area in which the thermoplastic molding compound can accumulate, wherein the molding compound when curing connects to the projectile such that the mold core can be pulled by way of the projectile.

An undercut blind bore is preferably provided in the shell area of the projectile.

A further aspect of the invention relates to an injection molding device which is configured in particular for carrying out the method described above. This aspect relates to an injection molding device for producing tubes, having a tool that forms an article cavity, having means for filling the article cavity with a thermoplastic molding compound, having an injection device for injecting a fluid toward a projectile that is to be driven from a first opening of the article cavity through the article cavity in the direction toward a second opening of the article cavity, having a secondary cavity for receiving the molding compound that is displaced by the projectile, having a mold core which is insertable into the second opening, wherein the mold core together with the article cavity forms a molding cavity that is capable of being filled, and wherein the mold core encloses an volume which forms the secondary cavity, wherein the volume of the secondary cavity has a cross section that is smaller than or approximately equal to the cross section of the projectile, and wherein an internal delimitation wall of the secondary cavity is provided with at least one depression and/or one embossed feature.

In the context of the present patent application those parts of the injection molding device which form the article cavity are referred to as the tool. The tool in the context of the invention can have further movable mold parts such as slides, movable mold cores, and the like.

The injection device for injecting a fluid toward the projectile to be driven through the article cavity expediently comprises a projectile carrier which can be penetrated by one or a plurality of fluid ducts and on that end of the former that is configured for receiving the projectile configures an injection nozzle.

The injection molding device according to the invention can comprise at least one sprue which opens into the article cavity. In principle, the article cavity as well as the secondary cavity can have a polygonal or prismatic, respectively, as well as a cylindrical cross section, or be in each case configured as a polygonal or prismatic or cylindrical volume, respectively.

In the case of one preferred variant of the injection molding device according to the invention it is provided that the article cavity and the secondary cavity are configured as a cylindrical volume. The volume of the secondary cavity is expediently dimensioned such that that said volume can receive the entire quantity of the molding compound that is displaced by the projectile.

The mold core is expediently configured as a mandrel which, for example, can have a contour which is configured so as to be complementary to a contour of the article cavity that at the end side is widened in the manner of a sleeve. The mold core in the article cavity expediently forms an encircling annular gap or annular space which is capable of being filled with the molding compound. The mold core is expediently configured as a calibration mandrel for generating the connection geometry of the tube.

The mold core can be movable in a rotary and/or translatory manner by means of a hydraulic or pneumatic actuator.

When the mold core is driven a rotary manner, that is to say is configured as a rotary core, the latter can have a shell area having at least one thread-forming portion.

The mold core in a first position seals the article cavity. In a second position of the mold core, this being the pulled demolding position, said mold core releases the second opening of the article cavity.

The mold core can have a closure member that is disposed so as to be adjustable in said mold core and in a first position closes the secondary cavity and in a second position releases the secondary cavity.

According to the invention it is provided that the cylindrical volume of the secondary cavity has a diameter which is smaller than or equal to the diameter of the projectile.

In one variant of the injection molding device an undercut blind bore is provided in the shell area of the projectile.

At least one depression and/or one embossed feature is provided in an internal delimitation wall of the secondary cavity. In the case in which the projectile invades the secondary cavity of the mold core, said projectile will generate a thin film of molten molding compound between an internal delimitation wall of the secondary cavity and the projectile. This film under certain circumstances is still connected to the molding compound that forms the tube. This film is torn off when the mold core is pulled. In order for the tearing-off to be facilitated, molding compound will accumulate in the depression or the embossed feature, which attempts to resist the demolding movement of the mold core such that a tensile force is exerted on the thin place or the predetermined breaking line that is generated between the mold core and the molding compound that forms the tube. Of course, a plurality of depressions or embossed features can be provided on the circumference of the internal delimitation wall of the secondary cavity.

Alternatively thereto, it can be provided that the mold core at the end side has a wiper lip that projects into the secondary cavity, or into an opening of the secondary cavity, respectively. The film of the molding compound that is entrained by the projectile would be shorn off on said wiper lip.

BRIEF DESCRIPTION OF THE DRAWINGS

The invention will be explained hereunder with reference to the exemplary embodiments illustrated in the drawings in which.

DETAILED DESCRIPTION

The method according to the invention will be explained hereunder with reference to the figures that represent parts of an injection molding device 1.

Figure 1:
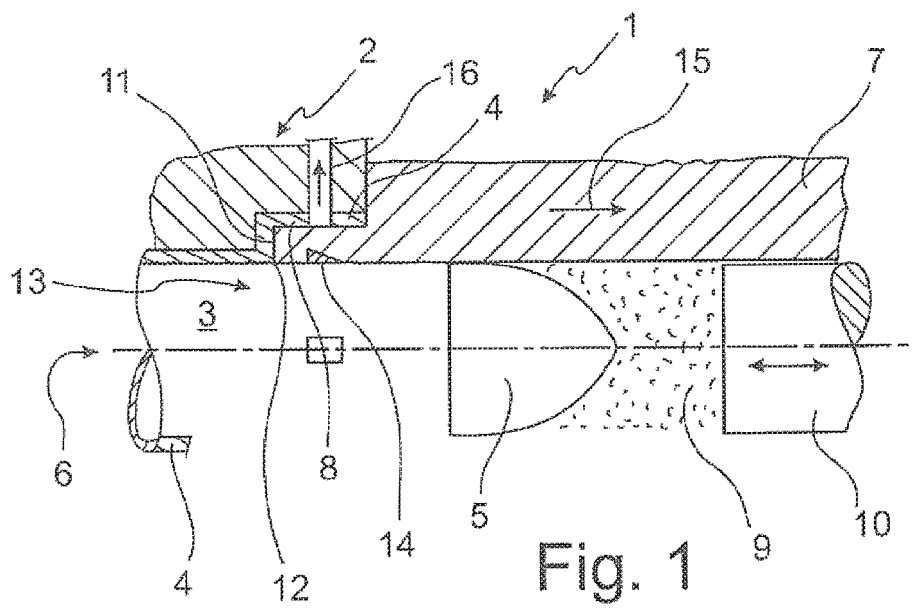
FIG. 1 shows a partial sectional view of an injection molding device 1 according to the invention and according to a first exemplary embodiment.

To this end, reference is first made to FIG. 1 which shows a partial section through an injection molding device 1 according to the invention. The injection molding device 1 comprises a tool 2 which is only indicatively illustrated in the figures and, for example, comprises two halves which in the closed state define an article cavity 3 which forms a negative of a tube 4 to be fabricated.

The figures show an end of the article cavity 3 in the region of an end of the tube 4. In particular, the figures show that end of the tube 4 to be molded which is widened in the manner of a sleeve and has a connection geometry for receiving a connector component. That end of the article cavity 3 that is disposed so as to be remote from a sprue (not shown) and from a first opening having an injection device is illustrated in figures.

The tool 2 of the injection molding device 1 is composed, for example, of two mold halves which define the article cavity 3, wherein the article cavity 3 is configured as the negative of a tube (3D tube) that is curved multiple times in space. The tool can have a plurality of movable components in the form of slides or the like, which are not illustrated in the drawing. An injection device for injecting a fluid toward a projectile 5 that is to be driven through the article cavity 3 is provided on that end of the tool 2, or of the article cavity 3, respectively, that is not illustrated, wherein the injection device comprises a projectile carrier having at least one injection nozzle and having at least one projectile receptacle for the projectile 5 as the displacement member for a thermoplastic molding compound that is to be filled into the article cavity 3.

The article cavity 3 at the second end of the article cavity 3 that is illustrated in the figures is widened in the manner of a funnel or sleeve. The article cavity 3 in this region forms a second opening 6 into which a mold core 7 is inserted such that the latter seals the article cavity 3 in the region of the second opening 6.

The mold core 7 in the position thereof that seals the article cavity 3 is shown in FIG. 1. The mold core 7 is capable of being demolded or pulled, respectively, from this position into a position that releases the article cavity 3. This position of the mold core 7 is not illustrated in the drawings.

The mold core 7 is configured as a calibrating mandrel that is circular in the cross section. The mold core 7 in the region of the widening of the article cavity 3 forms a molding cavity which is configured as an annular space 8. The connection cross section of the tube 4 thus formed is configured as a sleeve that is circular in the cross section; however, the invention is to be understood such that this region of the tube 4 can have any other arbitrary shape, depending on the design of the article cavity 3 and of the mold core 7 in this region of the tool 2.

The mold core 7 encloses a preferably cylindrical volume 9 which forms a secondary cavity of the tool 2. The volume 9 of the mold core 7 is dimensioned such that said volume 9, as will yet be described hereunder, can receive completely the molding compound that is displaced by the projectile 5. Only parts of the mold core 7 are illustrated in the figures; the size ratios are neither true to scale nor proportional; FIG. 1 shows only a schematic view of parts of the tool 2.

The volume 9 of the mold core that serves as the secondary cavity is preferably configured so as to be cylindrical and forms an extension, or an appendage, respectively, of the article cavity 3. The volume 9 of the mold core 7 is oriented so as to be coaxial with and aligned to the article cavity 3 and in the case of the exemplary embodiments illustrated in FIGS. 1 and 2 has an internal diameter which corresponds to the internal diameter of the article cavity 3 and to the external diameter of the projectile 5. When the article cavity 3 and the volume 9 of the mold core 7 have a polygonal or prismatic internal contour, the external contour of the projectile expediently corresponds to the internal contour of the article cavity and of the secondary cavity.

The volume 9 of the mold core 7 in all figures is illustrated in the open state; the projectile 5 in this state is in each case shown in the terminal position thereof.

Figure 2:
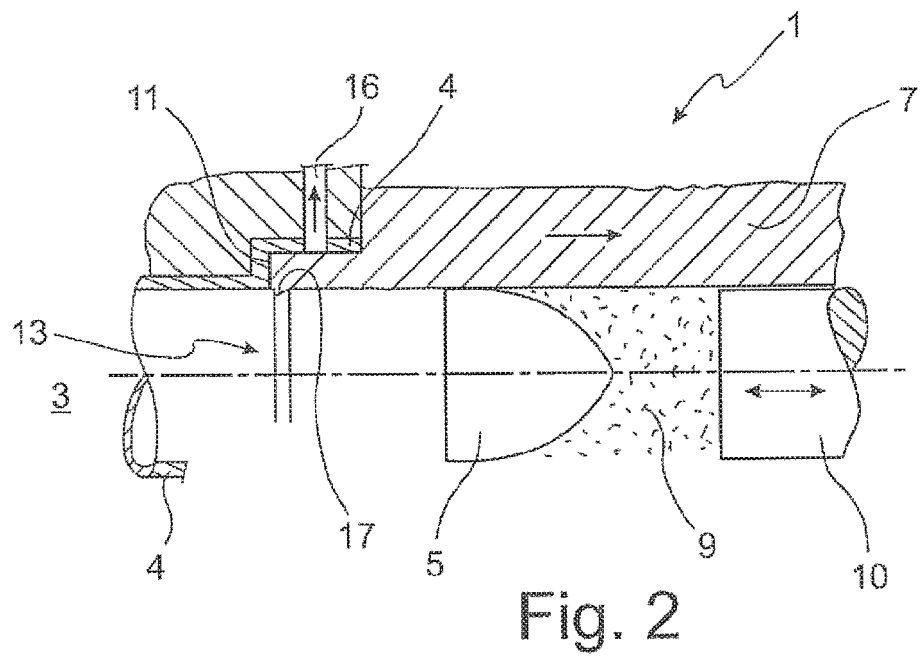
FIG. 2 shows a partial sectional view of an injection molding device according to the invention and as per a second exemplary embodiment.

In the case of the exemplary embodiment illustrated in FIGS. 1 to 3 the mold core 7 comprises a movable and cylindrical closure member 10 which in FIGS. 1 to 3 is in each case shown in an opened position in which the closure member 10 in each case releases the volume 9 of the mold core 7.

At the start of the method according to the invention, the closure member 10 is located in a position in which the latter terminates so as to be flush with an end face 11 of the mold core 7. The closure member 10 is disposed so as to be adjustable within the mold core 7; for example, the closure member 10 by way of a mechanism (not illustrated) is hydraulically or pneumatically adjustable between two terminal positions. In that position of the closure member 10 that is not illustrated, said closure member 10 in this position closing the volume 9 of the mold core, filling of the article cavity 3 with a thermoplastic molding compound is performed by way of a sprue that is disposed so as to be remote from the end of the article cavity 3 shown.

Once the article cavity 3 has been completely or partially filled, the molding compound extends across the entire cross section of the article cavity and into the annular space 8. The closure member 10 thereafter is moved into an opened position illustrated in FIG. 1, in which the volume 9 of the mold core 7 is released, consequently forming a secondary cavity that is not filled.

The projectile 5 thereafter is impinged with a fluid, for example with water, and is driven through the article cavity 3, wherein said projectile 5 displaces a liquid core of the thermoplastic molding compound that is filled into the article cavity 3 into the volume 9 of the mold core. FIG. 1 shows the projectile 5 in the terminal position thereof, in which said projectile 5 has been driven into the volume 9 of the mold core 7. The thermoplastic molding compound herein is shorn off on an internal encircling edge 12 of an opening 13 of the volume 9 of the mold core 7, wherein the projectile 5 between the latter and the internal enclosing wall of the volume 9 configures a thin film of molding compound. Part of the molding compound herein is displaced into depressions 14 on the internal delimitation wall of the volume 9 of the mold core 7.

In a further method step, the mold core 7 is pulled out of the article cavity 3 in the direction of the arrow 15, wherein the molding compound which has been displaced into the depressions 14 and which in the meantime has at least partially solidified, resists said extraction movement of the mold core 7. As a result thereof, traction is exerted on the material film of the molding compound that has solidified in the meantime and projects into the volume 9 of the mold core 7. As a result thereof, the projecting material is torn off. The molding compound that has displaced into the volume 9 is thus separated from the molding compound that forms the tube 4 by way of the mold core 7.

Further mold slides which protrude laterally into the article cavity 3 and toward the mold core 7 laterally generate windows in the sleeve of the tube 4 thus molded are identified by the reference sign 16.

The exemplary embodiment of the injection molding device 1 according to the invention illustrated in FIG. 2 corresponds substantially to the exemplary embodiment of the injection molding device 1 illustrated in FIG. 1, wherein the same components are identified by the same reference signs. The exemplary embodiment illustrated in FIG. 2 differs from that exemplary embodiment illustrated in FIG. 1 in that the mold core 7 at the end side has a wiper lip 17 that projects into the opening 13 of the volume 9, the projectile 5 when being driven into the volume 9 shearing the thermoplastic molding compound between the projectile 5 and the internal delimitation wall of the volume 9 on said wiper lip 17.

The exemplary embodiment illustrated in FIG. 3 corresponds substantially to that in FIGS. 1 and 2, wherein the same components are provided with the same reference signs.

Figure 3A:
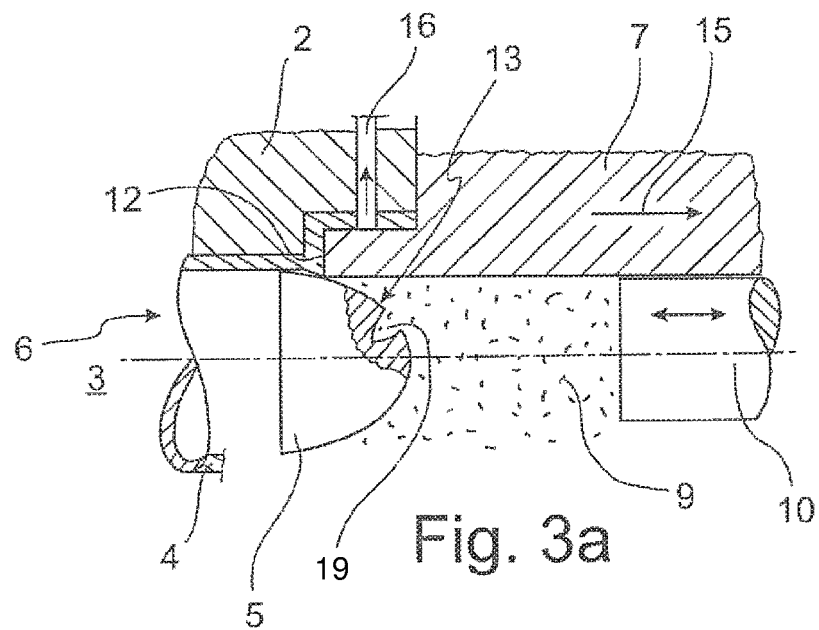
FIGS. 3a and 3b show a partial sectional view of an injection molding device according to the invention and as per a third exemplary embodiment of the invention.

The projectile 5 in the case of the exemplary embodiment according to FIG. 3a has a perforated shell area in which thermoplastic molding compound can accumulate. The thermoplastic molding compound, when curing, connects to the projectile such that the projecting material is torn off when the mold core 7 is pulled. To this end, the shell area of the projectile 5 can have a blind bore 19, for example. The blind bore forms an undercut which causes the curing molding compound to be anchored.

Moreover, the opening 13 of the volume 9 has a diameter that is slightly smaller than that of the article cavity 3 and than the largest diameter of the projectile 5, such that the encircling edge 12 that delimits the opening 13 forms a pinch edge on which the projectile 9 severs the thermoplastic molding compound.

The invention is to be understood such that the particular design embodiment of the projectile and the configuration of the opening 13 of the volume 9 are measures which can be implemented in a mutually independent manner.

Figure 3B:
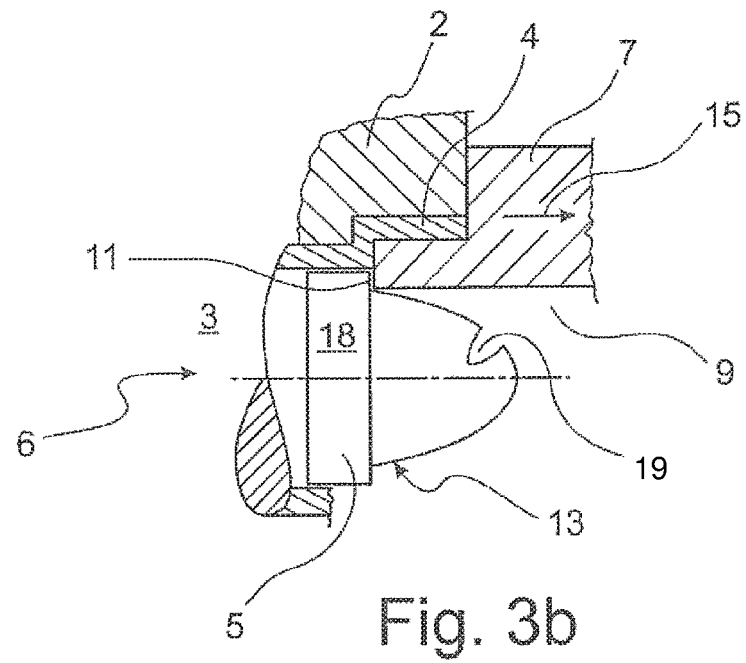

The variant of the injection molding device shown in FIG. 3b differs from that in FIG. 3 in that the projectile 5 has an encircling shoulder 18 which impacts on the end face 11 of the mold core 7. The diameter of the opening 13 of the volume 9 is smaller than the diameter of the article cavity 3 also in the case of this exemplary embodiment.

LIST OF REFERENCE SIGNS

1. Injection molding device
2. Tool
3. Article cavity
4. Tube
5. Projectile
6. Second opening
7. Mold core
8. Annular space
9. Volume of the mold core
10. Closure member
11. End face
12. Edge
13. Opening of the volume
14. Depressions in the internal delimitation wall of the volume
15. Arrow
16. Mold slide
17. Wiper lip
18. Shoulder
19. Blind bore

What is claimed is:

1. A method for producing a tube by injection molding a thermoplastic molding compound while using an injection molding device having an article cavity which defines an external contour of the tube, having an injection device which is configured for driving a projectile through the article cavity that is filled with the thermoplastic molding compound while displacing a liquid core of the molding compound, wherein the method comprises
   introducing the projectile into a first opening of the article cavity;
   closing a second opening of the article cavity, disposed so as to be remote from the first opening, by way of a mold core which together with the article cavity forms a molding cavity and which has a secondary cavity that is fillable with the molding compound, wherein the molding cavity is formed partially in an area between the article cavity and the mold core;
   at least partially filling the article cavity and the molding cavity with the thermoplastic molding compound;
   driving the projectile from the first opening through the article cavity to the second opening while partially displacing the molding compound into the secondary cavity, wherein the projectile is driven toward or into the mold core, and a thin place or a predetermined breaking line is generated between the molding compound that forms the tube and the molding compound that is displaced into the secondary cavity; and
   pulling the mold core together with the filled secondary cavity, wherein, by the pulling of the mold core, the displaced molding compound is separated from the molding compound that forms the tube.

2. The method as claimed in claim 1, wherein the secondary cavity of the mold core is kept closed during the filling of the article cavity.

3. The method as claimed in claim 1, wherein the secondary cavity is opened immediately prior to the projectile being driven through the article cavity.

4. The method as claimed in claim 1, wherein the secondary cavity is opened with the aid of the melt pressure that is generated by the displaced molding compound.

5. The method as claimed in claim 2, wherein the mold core has a movable closure member which keeps closed the secondary cavity and immediately prior to the article cavity being filled, or while the article cavity is being filled, is moved into an opened position that releases the secondary cavity.

6. The method as claimed in claim 1, wherein the projectile is driven into the secondary cavity and in the terminal position closes the secondary cavity.

7. The method as claimed in claim 1, wherein the projectile is driven partially into the secondary cavity, wherein a shell area of the projectile is brought to bear against a pinch edge of the mold core, the projectile in this terminal position closing the secondary cavity.

8. The method as claimed in claim 1, wherein the projectile is driven partially into the secondary cavity, wherein an encircling shoulder of the projectile is brought to bear against an end side of the mold core, wherein the projectile in this terminal position closes the secondary cavity.

9. The method as claimed in claim 7, wherein the projectile has a perforated shell area in which the thermoplastic molding compound can accumulate, wherein the molding compound when curing connects to the projectile.

10. The method as claimed in claim 9, wherein an undercut blind bore is provided in the shell area of the projectile.

11. An injection molding device, in particular for carrying out the method as claimed in claim 1, for producing tubes, having a tool that forms an article cavity, having means for filling the article cavity with a thermoplastic molding compound, having an injection device for injecting a fluid toward a projectile that is to be driven from a first opening of the article cavity through the article cavity in the direction toward a second opening of the article cavity, having a secondary cavity for receiving the molding compound that is displaced by the projectile, having a mold core which is insertable into the second opening and which together with the article cavity forms a molding cavity that is capable of being filled with the molding compound, wherein the mold core encloses a volume which forms the secondary cavity, and that the volume of the secondary cavity has a cross section which is smaller than or approximately equal to the cross section of the projectile, wherein an internal delimitation wall of the secondary cavity is provided with at least one depression and/or an embossed feature.

12. The injection molding device as claimed in claim 11, wherein the secondary cavity is configured as a prismatic or cylindrical volume.

13. The injection molding device as claimed in claim 11, wherein the mold core has a closure member that is disposed so as to be adjustable in said mold core and in a first position closes the secondary cavity and in a second position releases the secondary cavity.

14. The injection molding device as claimed in claim 11, wherein the mold core at the end side has a wiper lip that projects into the secondary cavity.

15. The method as claimed in claim 1, wherein the thermoplastic molding compound is selected from the group comprising high-density polyethylene, polyamide, polyamide 6, polyamide 12, polyurethane, polycarbonate, acrylonitrile-butadiene-styrene-copolymer, polyketone, and polystyrene.

* * * * *